United States Patent
Lutjen et al.

(10) Patent No.: US 10,801,353 B2
(45) Date of Patent: Oct. 13, 2020

(54) DIVOT PATTERN FOR THERMAL BARRIER COATING

(71) Applicant: United Technologies Corporation, Farmington, CT (US)

(72) Inventors: Paul M. Lutjen, Kennebunkport, ME (US); Christopher W. Strock, Kennebunkport, ME (US); Jose R. Paulino, Saco, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 31 days.

(21) Appl. No.: 16/270,789

(22) Filed: Feb. 8, 2019

(65) Prior Publication Data

US 2020/0256206 A1 Aug. 13, 2020

(51) Int. Cl.
*F01D 11/12* (2006.01)

(52) U.S. Cl.
CPC ........ *F01D 11/122* (2013.01); *F05D 2220/32* (2013.01); *F05D 2230/90* (2013.01); *F05D 2240/11* (2013.01); *F05D 2240/55* (2013.01)

(58) Field of Classification Search
CPC ...... F01D 11/12; F01D 11/124; F01D 11/127; F01D 5/288; F05D 2230/90; F05D 2240/11; C23C 4/02
See application file for complete search history.

(56) References Cited

U.S. PATENT DOCUMENTS

| | | | | |
|---|---|---|---|---|
| 6,316,078 | B1* | 11/2001 | Smialek | C23C 4/02 427/248.1 |
| 7,645,134 | B2* | 1/2010 | Jackson | B29C 33/424 425/471 |
| 8,852,720 | B2 | 10/2014 | Bolcavage et al. | |
| 9,713,912 | B2* | 7/2017 | Lee | C23C 4/18 |
| 10,480,334 | B2* | 11/2019 | Hudson | F01D 9/02 |
| 2008/0280101 | A1 | 11/2008 | Morrison | |
| 2013/0122259 | A1* | 5/2013 | Lee | B32B 3/30 428/164 |

(Continued)

FOREIGN PATENT DOCUMENTS

| | | | | |
|---|---|---|---|---|
| DE | 102005050873 A1 * | 4/2007 | | C23C 4/02 |
| DE | 102009011913 A1 * | 9/2010 | | C23C 28/3455 |
| EP | 3323984 | 5/2018 | | |

OTHER PUBLICATIONS

Extended European Search Report for EP Application No. 20156480.4 dated Jul. 10, 2020.

*Primary Examiner* — Michael Lebentritt
*Assistant Examiner* — Topaz L. Elliott
(74) *Attorney, Agent, or Firm* — Carlson, Gaskey & Olds, P.C.

(57) ABSTRACT

A component for a gas turbine engine includes a surface adjacent a flow of hot gases. A plurality of cavities is in a portion of the surface. The plurality of cavities have a first group of cavities with a first cross-section and a second group of cavities with a second cross-section different from the first cross-section. The first and second groups of cavities are arranged such that there is no straight line across the portion of the surface that does not intersect one of the plurality of cavities. A thermal barrier coating is over the surface and fills each of the plurality of cavities.

16 Claims, 5 Drawing Sheets

(56) References Cited

U.S. PATENT DOCUMENTS

| | | | |
|---|---|---|---|
| 2013/0209745 A1* | 8/2013 | Legoux | C23C 4/02 |
| | | | 428/161 |
| 2015/0354406 A1 | 12/2015 | Farris | |
| 2016/0040548 A1* | 2/2016 | Paulino | F01D 11/122 |
| | | | 415/173.1 |
| 2016/0040551 A1* | 2/2016 | Strock | F01D 25/005 |
| | | | 427/197 |
| 2016/0214907 A1 | 7/2016 | Shim et al. | |
| 2017/0121232 A1* | 5/2017 | Nelson | C04B 41/009 |
| 2018/0010469 A1* | 1/2018 | Kadau | F01D 5/288 |
| 2018/0066527 A1 | 3/2018 | Kadau | |
| 2018/0135439 A1* | 5/2018 | Devore | F01D 5/14 |
| 2018/0135441 A1* | 5/2018 | Hudson | F02C 3/04 |
| 2019/0195080 A1* | 6/2019 | Paulino | C23C 4/10 |

\* cited by examiner

DIVOT PATTERN FOR THERMAL BARRIER COATING

BACKGROUND

This disclosure relates to thermal barrier coatings having enhanced heat resistance.

Gas turbine engines are known and typically include a compressor for compressing air and delivering it into a combustor. The air is mixed with fuel in the combustor and ignited. Products of the combustion pass downstream over turbine rotors, driving them to rotate.

Components that are exposed to high temperatures, such as a component within a gas turbine engine, typically include protective coatings. For example, components such as turbine blades, turbine vanes, blade outer air seals, and compressor components typically include one or more coating layers that function to protect the component from erosion, oxidation, corrosion or the like to thereby enhance component durability and maintain efficient operation of the engine.

As an example, some conventional turbine blade outer air seals include an abradable ceramic coating that contacts tips of the turbine blades such that the blades abrade the coating upon operation of the engine. The abrasion between the outer air seal and the blade tips provide a minimum clearance between these components such that gas flow around the tips of the blades is reduced to thereby maintain engine efficiency. The abradable coating may perform a thermal barrier (TBC) function by insulating the underlying material. Over time, internal stresses can develop in the protective coating to make the coating vulnerable to erosion and wear. The outer air seal may then need to be replaced or refurbished after a period of use.

SUMMARY

In one exemplary embodiment, a component for a gas turbine engine includes a surface adjacent a flow of hot gases. A plurality of cavities is in a portion of the surface. The plurality of cavities have a first group of cavities with a first cross-section and a second group of cavities with a second cross-section different from the first cross-section. The first and second groups of cavities are arranged such that there is no straight line across the portion of the surface that does not intersect one of the plurality of cavities. A thermal barrier coating is over the surface and fills each of the plurality of cavities.

In a further embodiment of the above, the surface is on a blade outer air seal.

In a further embodiment of any of the above, the first and second groups of cavities are arranged such that there is no straight line across the portion that does not intersect one of the plurality of cavities.

In a further embodiment of any of the above, the first cross-section is a circle that has a first diameter and the second cross-section is a circle that has a second diameter smaller than the first diameter.

In a further embodiment of any of the above, the first cross-section is a circle and the second cross-section is a slot shape.

In a further embodiment of any of the above, the plurality of cavities span at least 30% of the cavity layer.

In a further embodiment of any of the above, a center of each cavity in the first group is arranged at a corner of a square.

In a further embodiment of any of the above, a ratio of an area of the plurality of cavities within the square to an area of the square is greater than about 0.53.

In a further embodiment of any of the above, the ratio is greater than about 0.56.

In a further embodiment of any of the above, the ratio is between about 0.56 and about 0.58.

In a further embodiment of any of the above, the seal body is a ceramic material.

In a further embodiment of any of the above, the thermal barrier coating is an abradable coating that fills each of the plurality of cavities.

In a further embodiment of any of the above, the abradable coating is a geometrically segmented abradable coating formed from a ceramic material.

In another exemplary embodiment, a turbine section for a gas turbine engine includes a turbine blade that extends radially outwardly to a radially outer tip and for rotation about an axis of rotation. A component has a first side and a second side. The first side has a cavity layer has a plurality of cavities on a portion of the first side. The plurality of cavities have a first group of cavities with a first cross-section and a second group of cavities with a second cross-section different from the first cross-section. A thermal barrier coating is over the cavity layer.

In a further embodiment of any of the above, a center of each cavity in the first group is arranged at a corner of a square.

In a further embodiment of any of the above, the first cross-section is a circle that has a first diameter and the second cross-section is a circle that has a second diameter smaller than the first diameter. A center of each cavity in the second group is arranged in a middle of the square.

In a further embodiment of any of the above, the first cross-section is a circle and the second cross section is a slot shape. Each cavity in the second group is arranged along an edge of the square.

In a further embodiment of any of the above, a ratio of an area of the plurality of cavities in the square to an area of the square is greater than about 0.56.

In a further embodiment of any of the above, the thermal barrier coating is an abradable coating.

In a further embodiment of any of the above, the component is one of a ceramic and a metallic material.

These and other features may be best understood from the following drawings and specification.

DETAILED DESCRIPTION

Figure 1:
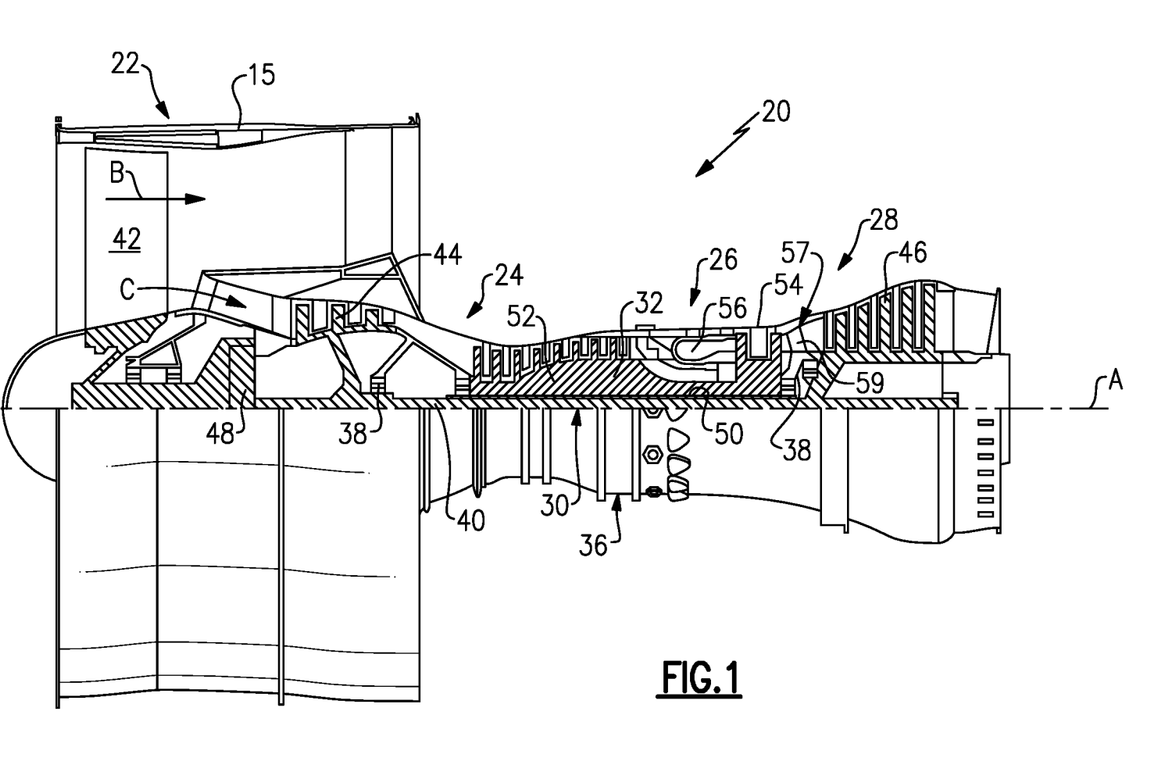
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
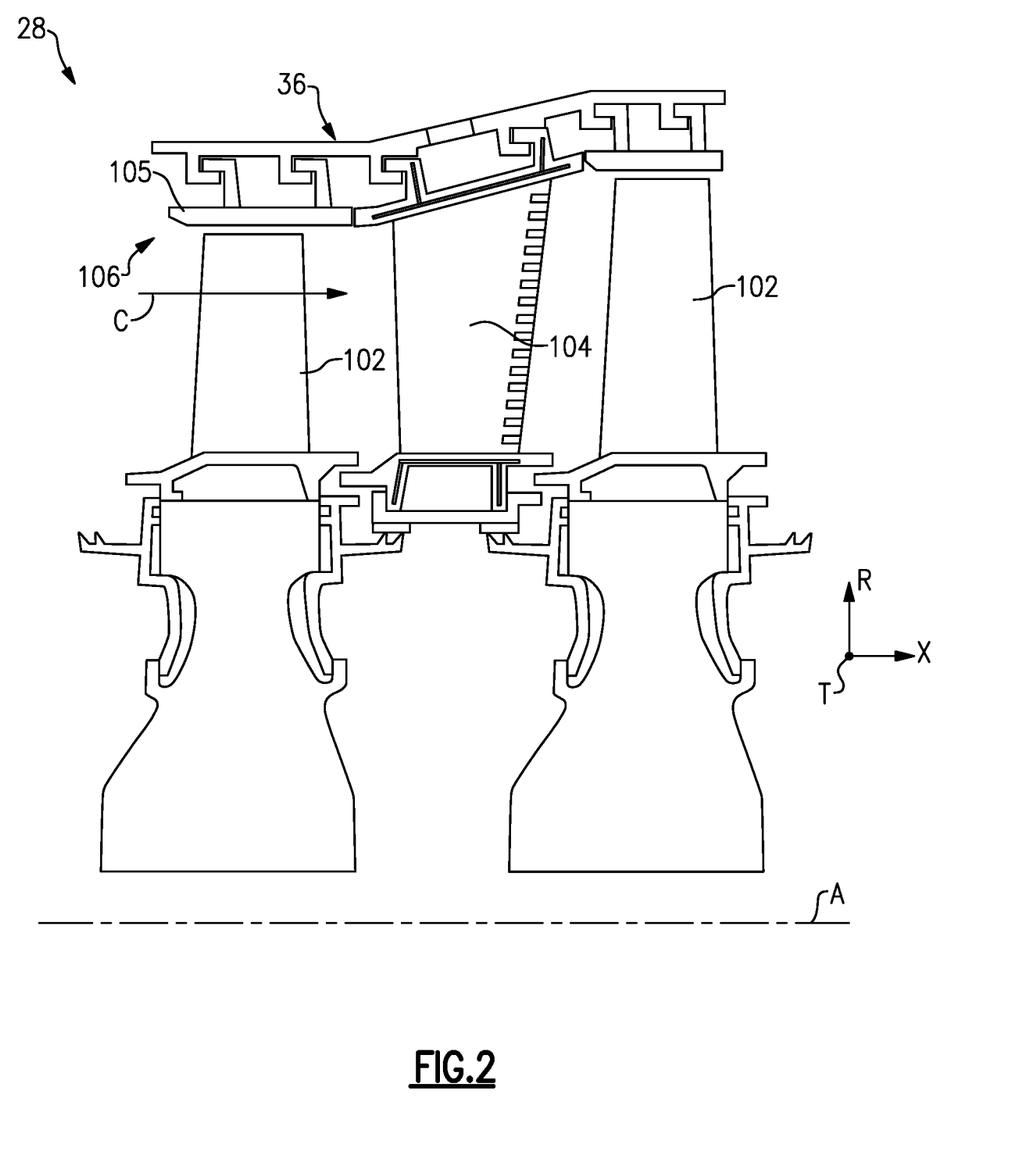
FIG. 2 schematically shows a portion of a turbine section.

FIG. 2 schematically illustrates a portion of the turbine section 28. The turbine section 28 includes alternating series of rotating blades 102 and stationary vanes 104 that extend into the core flow path C of the gas turbine engine 20. Turbine blades 102 rotate and extract energy from the hot combustion gases that are communicated along the core flow path C of the gas turbine engine 20. The turbine vanes 104, which generally do not rotate, guide the airflow and prepare it for the next set of blades 102. As is known, it is desirable to pass the bulk of products of combustion downstream of the combustor section 26 across the turbine blades 102. Thus, a blade outer air seal ("BOAS") 106 is positioned slightly radially outwardly of the outer tip of the blades 102. It should be understood that the turbine section 28 could be utilized in other gas turbine engines, and even gas turbine engines not having a fan section at all. The BOAS 106 is made up of a plurality of BOAS segments 105 arranged circumferentially about the axis of rotation A. Although a BOAS segment 105 is described, the teachings of this disclosure may be applicable to other components, such as blades, vanes, combustor liners, and transition ducts for example.

Figure 3:
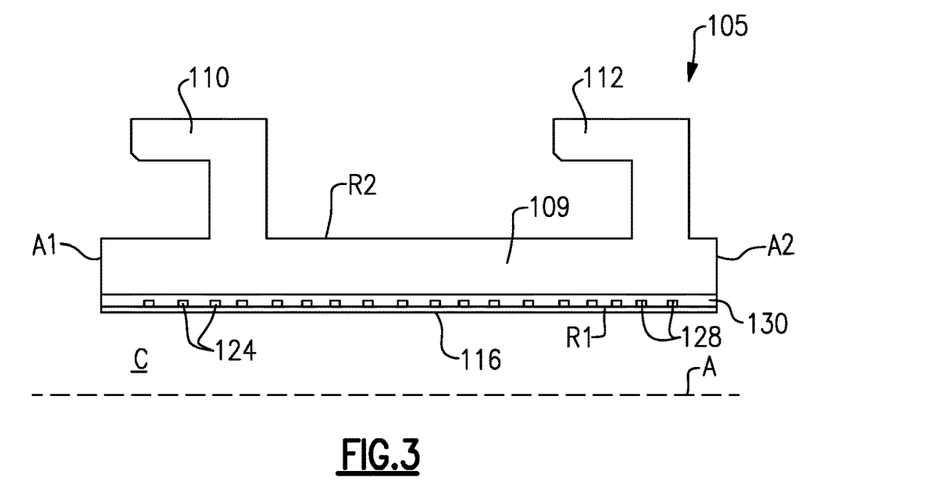
FIG. 3 shows a blade outer air seal according to exemplary embodiment.

FIG. 3 illustrates a cross section of an exemplary BOAS segment 105 from a circumferential direction. Each seal segment 105 is a body that defines radially inner and outer sides R1, R2, respectively, and first and second axial sides A1, A2, respectively. The radially inner side R1 faces in a direction toward the engine central axis A. The radially inner side R1 is thus the hot wall or gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

The BOAS segment 105 has hooks 110 and 112 and a central wall 109. In this embodiment, the BOAS segment 105 may be formed of a metallic alloy. Example alloys may include, but are not limited to, nickel alloys, cobalt alloys, a nickel alloy coated with cobalt or cobalt alloy, or non-nickel alloys that do not substantially react with ceramic. In another embodiment, the seal segment 105 may be formed of a ceramic or ceramic matrix composite ("CMC") material, such as a monolithic ceramic, or a silicon carbide composite.

Blade outer air seals in general may include barrier coatings (e.g., thermal or environmental barrier coatings) on the gas path side that serve to protect the underlying structure, typically formed of an alloy. In the present disclosure, a portion of the radially inner side R1 of the disclosed seal segment 105 has a thermal barrier coating (TBC) 116. In one example, the coating 116 is an abradable coating. An abradable coating on a BOAS seal segment 105 contacts tips of the turbine blades 102 such that the blades 102 abrade the coating 116 upon operation of the engine 20. This provides a minimum clearance between the BOAS seal segment 105 and the tip of the blade 102. However, over time internal stresses can develop in the coating that may make the coating 116 vulnerable to erosion and wear.

With some known abradable coatings, the BOAS segments 105 need to be replaced after a period of use. In one example, the thermal barrier coating 116 is a geometrically segmented abradable coating ("GSAC"). The use of a GSAC can help reduce the stresses in the coating 116. When the coating 116 is a GSAC, the coating 116 forms segmentation cracks, which provide locations to accommodate the strain associated with internal stresses. That is, the energy associated with the internal stresses is maintained at a lower level due to the segmentation cracks.

The exemplary seal segment 105 includes a cavity layer 130 and a coating 116 on the radially inner side R1. In one embodiment, the coating 116 is a ceramic material. The cavity layer 130 has a plurality of cavities 124. Each of the cavities 124 is filled with the coating 116. When the coating 116 is a GSAC, the cavities 124 may facilitate the cracks in the coating 116, which may lower internal stresses. The coating 116 fills each of the cavities 124, and may have an additional thickness radially inward of the cavity layer 130. In one example, the coating 116 provides a generally smooth radially inner surface for the BOAS seal segment 105. That is, the coating 116 provides the hot wall surface immediately adjacent the tips of the turbine blades 102. In some embodiments, the plurality of cavities 124 extend over the entire surface R1. In other embodiments, the plurality of cavities 124 extend over a portion of the surface R1. The cavities 124 are located at least in the portion of the structure with the most thermally severe conditions, such as the blade tip path. When the coating 116 has worn over time, a portion of the cavity layer 130 may be left exposed. After the coating 116 has worn off some portions of the surface R1, coating 116 remains in the cavities 124. The coating 116 remaining in the cavities 124 still provides protection to the component 105.

Figure 4:
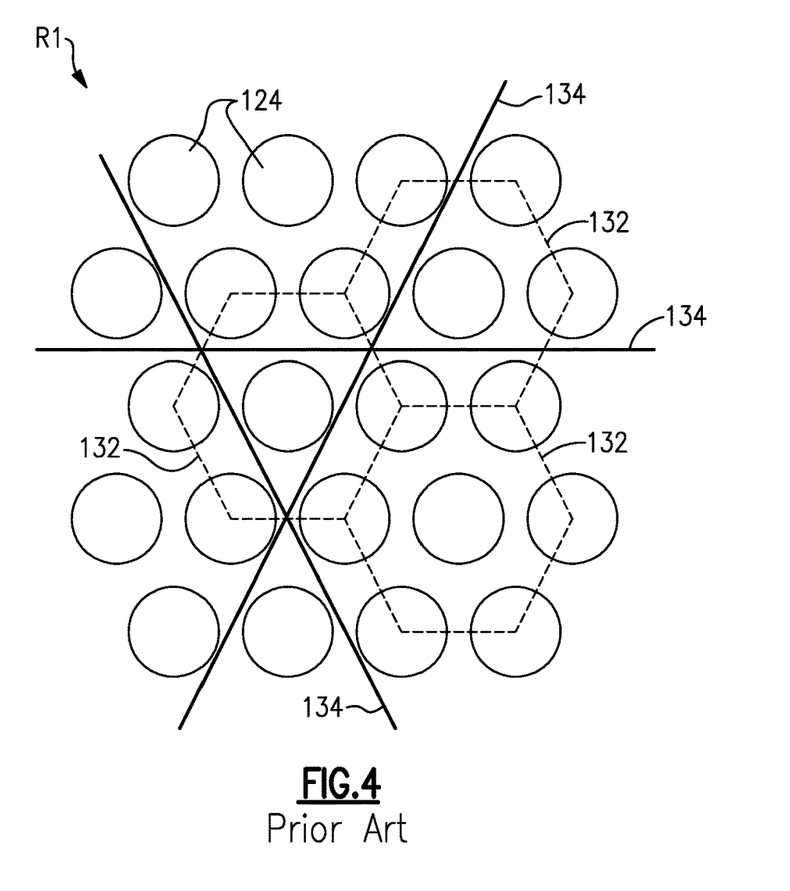
FIG. 4 shows a known cavity arrangement for a blade outer air seal.

FIG. 4 illustrates a cavity arrangement on the radially inner side R1 of a known BOAS seal segment. The radially inner side R1 has a plurality of cavities 124 arranged in a hexagonal pattern. That is, the cavities 124 are all the same size and shape, and arranged such that the centers of six cavities 124 form the points of a regular hexagon 132. This arrangement is known as a hexagonal close packed structure. A line of continuous web does not create the GSAC segmentation desired for coating retention. The line of continuous web 134 refers to a straight line across the surface that does not intersect any of the cavities 124. The hexagonal close packed arrangement has many lines of continuous web 134 between each diagonal row of cavities. These are the areas where the GSAC may not segment in an effective way.

In one example, the known hexagonal arrangement of FIG. 4 has a cavity diameter of about 0.080 inches (2.032 mm). In this example, the total area of an example hexagon 132 is 0.029 in$^2$ (18.710 mm$^2$). The divot area, or area of the cavities within the hexagon 132 is about 0.015 in$^2$ (9.677 mm$^2$). The divot area is also the area that has most of the thermal barrier coating 116. Thus, a ratio of the divot area to the total area is 0.526. That is, when the coating 116 has worn from the surface R1, about 53% of the surface (i.e., the areas of the cavities) will still have the coating 116, while about 47% of the surface is the underlying material, such as ceramic or metal. A higher ratio will provide better thermal protection for the substrate, as there is a larger area with the thermal barrier coating 116.

The cavity arrangements discussed herein eliminate any line of continuous web by using two different cavity shapes and/or sizes. In other words, the disclosed arrangements have cavities with differing cross-sections. The cavity arrangements discussed herein may further allow for a higher ratio of divot area or cavity area to total area, which provides better thermal protection.

Figure 5:
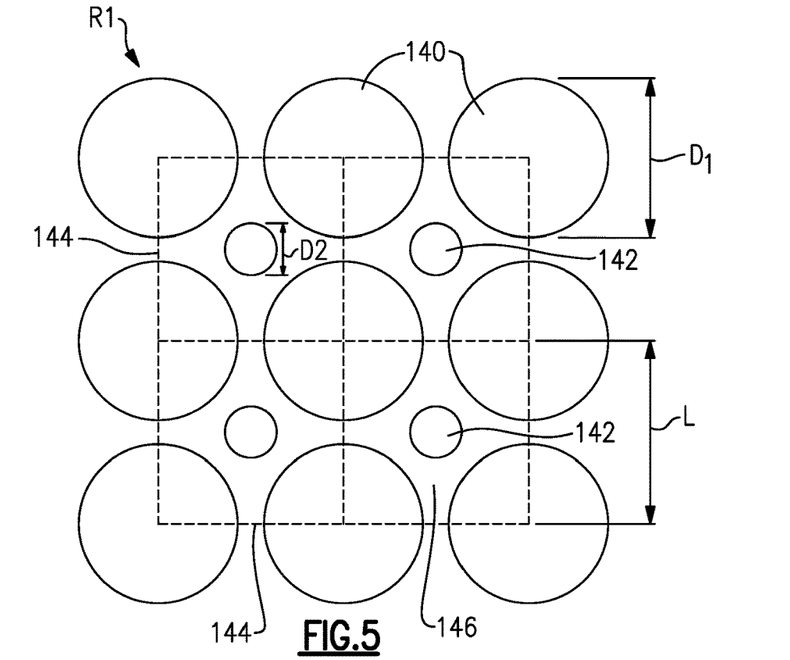
FIG. 5 shows a portion of a blade outer air seal according to an embodiment.

FIG. 5 illustrates a portion of the radially inner side R1 having a cavity arrangement according to a first embodiment. This arrangement utilizes two different sizes of cavities in order to eliminate any line of continuous web. The illustrated arrangement has a group of first cavities 140 and a group of second cavities 142. The first cavities 140 have a different size than the second cavities 142. The cavities 140, 142 are arranged in a square pattern (also known in the field of crystallography as face centered). That is, each of the first cavities 140 has a center that is arranged at a corner of a square 144 (the corners of a unit face centered cell in crystallography). The second cavities 142 are arranged between the first cavities 140, or at the center of the square 144 (the face center location in crystallography). The square 144 refers to a square with corners in the center of adjacent first cavities 140 (i.e., FIG. 5 shows four squares 144, for example).

This arrangement of the first and second cavities 140, 142 does not have any line of continuous web 134. That is, there is no straight line across the surface R1 that does not intersect any of the cavities 140, 142.

The first cavities have a first diameter $D_1$ and the second cavities have a second diameter $D_2$. In the illustrated example, the first diameter $D_1$ is greater than the second diameter $D_2$. Each of the sides of the squares 144 has a length L. The first diameter $D_1$ is smaller than the length L. In one example embodiment, the first diameter $D_1$ is about 0.110 in. (2.794 mm) and the second diameter $D_2$ is about 0.031 in. (0.787 mm). In this example, the total area of the square 144 is about 0.018 in$^2$ (11.613 mm$^2$) and the cavity area within a square 144 is about 0.010 in$^2$ (6.452 mm$^2$). Thus, in this example, a ratio of the cavity area to the total area is about 0.563. This is a greater ratio than the above described hexagonal pattern. This higher ratio arrangement will provide better thermal protection of the BOAS seal segment 105. In some embodiments, the ratio of cavity area to total area may be greater than about 0.53. In a further embodiment, the ratio may be greater than about 0.56. In some embodiments, the ratio may be between about 0.56 and 0.58.

In the illustrated embodiment, each of the cavities 124 is drilled to the same depth relative to the central wall 109 or relative to the second radial side R2. In other words, each cavity 124 has a surface 128. When the seal segment 105 is installed into a turbine section 28, each surface 128 will have the same radial position relative to the engine central axis A.

In some embodiments, the depth of the cavities 140, 142 may be related to the diameter of the cavity 140, 142. In one example, an aspect ratio of the width or diameter $D_1$, $D_2$ of the cavity 140, 142 to a depth of the cavity 140, 142 is between about 1 and 3.

In an example embodiment, the arrangement of cavities 140, 142 span at least 30% of the radially inner side R1. There may be portions forward or aft of a blade rub track without cavities 140, 142, but the cavities 140, 142 may occupy at least the full extent of the rub track of the blade, for example. This allows for the shift in that track of the blade 102 due to thermal expansion, engine and aircraft operating conditions, and various excursions.

Figure 6:
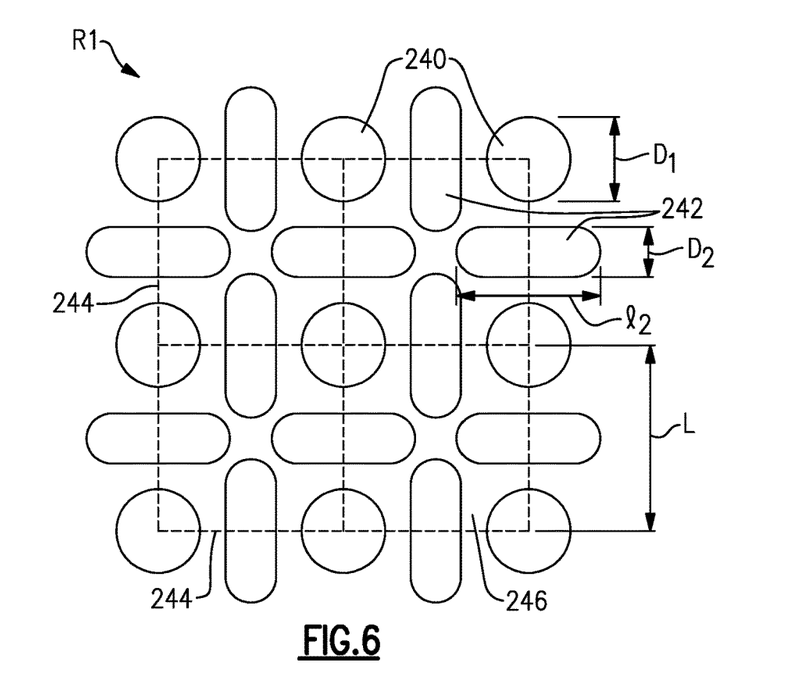
FIG. 6 shows a portion of a blade outer air seal according to another embodiment.

FIG. 6 illustrates a cavity arrangement according to another embodiment. This arrangement utilizes two different shaped cavities in order to eliminate any line of continuous web. The arrangement includes a group of first cavities 240 and a group of second cavities 242. The first cavities 240 have a different shape than the second cavities 242. The cavities 240, 242 are arranged in a square pattern. Each of the first cavities 240 has a center that is arranged at a corner of a square 244. The second cavities 242 are arranged between the first cavities 240 along edges of the square 244. In this example, the second cavities 242 have a racetrack or slot shape. In some examples, the slot shaped second cavities 242 have the same end diameter as the first cavities 240. Thus, they can be milled into the surface R1 with the same end mill diameter. In other embodiments, the slot shaped second cavities 242 may have a different end diameter from the first cavities. The first and second cavities 240, 242 are arranged such that there is no line of continuous web across the surface.

The first cavities have a first diameter $D_1$ and the second cavities have an end diameter $D_2$ and a length $l_2$. Each of the sides of the squares 244 has a length L. The first diameter $D_1$ is smaller than the length L. In one example, the first diameter $D_1$ is about 0.080 in. (2.032 mm), the second diameter $D_2$ is about 0.060 in. (1.524 mm), and the length $l_2$ is about 0.130 in. (3.302 mm). The square 244 has an area of about 0.036 in$^2$ (23.226 mm$^2$). A ratio of the divot area to the total area is about 0.529. In another example embodiment, the first diameter $D_1$ is about 0.080 in. (2.032 mm), the second diameter $D_2$ is about 0.080 in. (2.032 mm), and the length $l_2$ is about 0.142 in. (3.607 mm). The square 244 has an area of about 0.044 in$^2$ (28.387 mm$^2$). A ratio of the cavity area to the total area is about 0.567. These example ratios are greater than the hexagonal arrangement.

Figure 7:
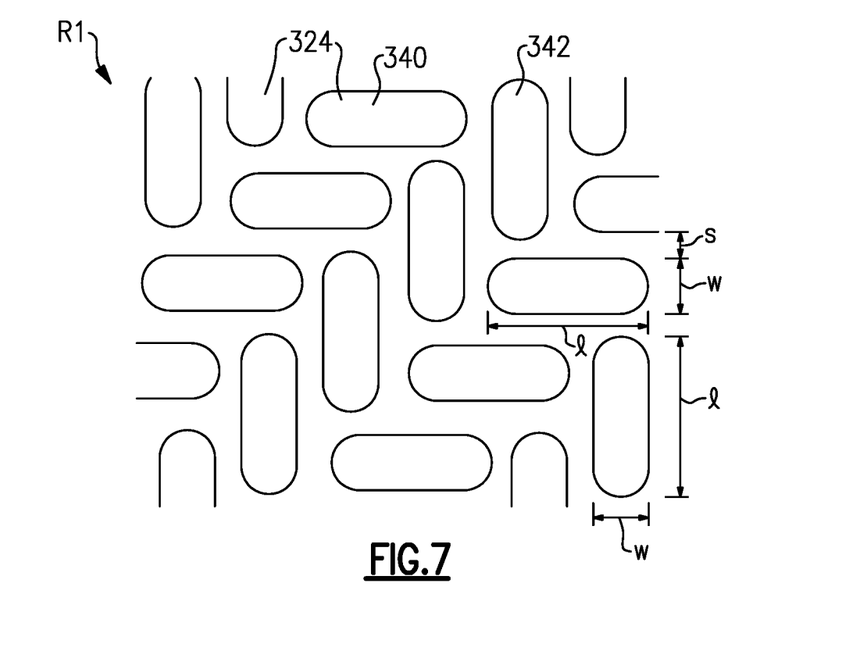
FIG. 7 shows a portion of a blade outer air seal according to another embodiment.

FIG. 7 illustrates a cavity arrangement according to another embodiment. This arrangement utilizes cavities 324 of the same size and shape oriented in two different directions in order to eliminate any line of continuous web. In this example, each of the cavities 324 has an elongated or slot shape. A group of first cavities 340 are arranged perpendicular to a group of second cavities 342. The first and second cavities 340, 342 alternate to form a herringbone pattern. This arrangement eliminates any line of continuous web across the surface R1. Each of the cavities 324 has a length l, and a width w. The length l is larger than the width w. In the illustrated example, the first and second cavities 340, 342 have the same length l and width w. The cavities 324 are spaced apart from one another by a distance s. In one example, the length l is about equal to two times the width w plus the distance s. This herringbone arrangement may have a higher ratio of cavity area to total area. The cavities may also vary from the herringbone arrangement somewhat in the horizontal and vertical direction such that they still eliminate any line of continuous web.

Figure 8:
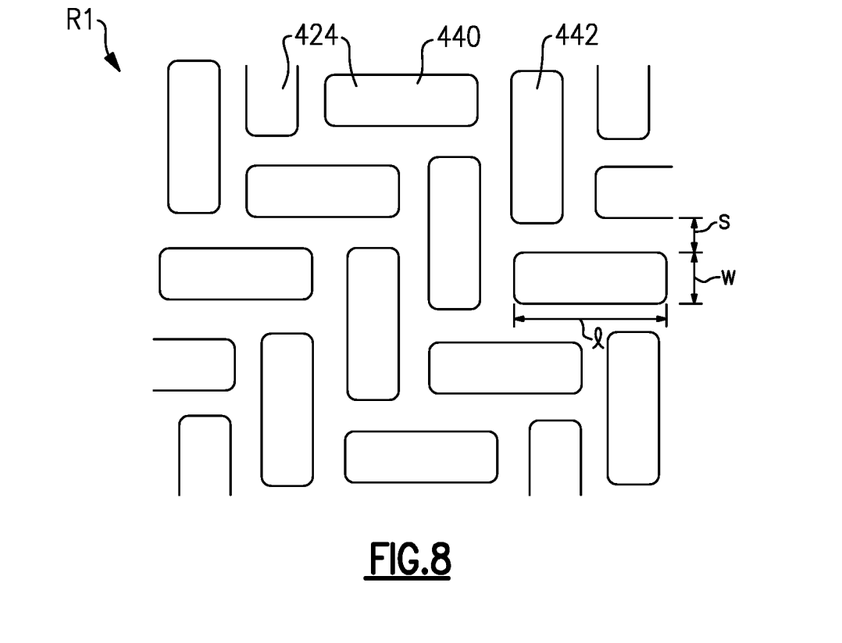
FIG. 8 shows a portion of a blade outer air seal according to another embodiment.

FIG. 8 illustrates another embodiment of the cavity arrangement of FIG. 7. This embodiment has a group of first cavities 440 arranged generally perpendicular to a group of second cavities 442. In this example, each of the cavities 424 has a rectangular shape with rounded corners. In one example, the length l of each cavity 424 is about equal to two times the width w plus the distance s between cavities 424.

In some examples, a BOAS seal segment 105 may have more than one cavity arrangement on the radially inner surface R1. For example, a portion of the surface R1 may have the cavity arrangement of FIG. 4 or another arrangement, while another portion of the surface R1 has the cavity arrangement of FIG. 5 or 6. In other examples, a portion of the surface R1 may have the cavity arrangement of FIG. 5, while another portion has the cavity arrangement of FIG. 6. The cavities 140, 142, 240, 242 may be milled into the surface, for example. In other examples, a portion of the surface R1 may have the cavity arrangement of FIG. 7, while another portion has the cavity arrangement of FIG. 8.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A component for a gas turbine engine, comprising:
   a surface adjacent a flow of hot gases;
   a plurality of cavities in a portion of the surface, the plurality of cavities having a first group of cavities with a first cross-section and a second group of cavities with a second cross-section different from the first cross-section, wherein the first and second groups of cavities are arranged such that there is no straight line across the portion of the surface that does not intersect one of the plurality of cavities, wherein the plurality of cavities span at least 30% of the surface, wherein the first cross-section is a slot shape arranged in a first direction and the second cross-section is a slot shape arranged in a second direction that is perpendicular to the first direction, and the first and second cavities alternate such that the first and second cavities form a herringbone pattern; and
   a thermal barrier coating over the surface and filling each of the plurality of cavities.

2. The component of claim 1, wherein the surface is on a blade outer air seal.

3. The component of claim 2, wherein the blade outer air seal is a ceramic material.

4. The component of claim 1, wherein the thermal barrier coating is an abradable coating that fills each of the plurality of cavities.

5. The component of claim 4, wherein the abradable coating is a geometrically segmented abradable coating formed from a ceramic material.

6. The component of claim 1, wherein the first cavities and the second cavities are the same size.

7. The component of claim 1, wherein the first cavities have a length and a width and the length is more than two times the width.

8. A component for a gas turbine engine, comprising:
   a surface adjacent a flow of hot gases;
   a plurality of cavities in a portion of the surface, the plurality of cavities having a first group of cavities with a first cross-section and a second group of cavities with a second cross-section different from the first cross-section, wherein the first and second groups of cavities are arranged such that there is no straight line across the portion of the surface that does not intersect one of the plurality of cavities, wherein the first cross-section is a circle and the second cross-section is a slot shape.

9. The component of claim 8, wherein a center of each cavity in the first group is arranged at a corner of a square.

10. The component of claim 9, wherein a ratio of an area of the plurality of cavities within the square to an area of the square is greater than 0.53.

11. The component of claim 10, wherein the ratio is greater than 0.56.

12. The component of claim 10, wherein the ratio is between 0.56 and 0.58.

13. A turbine section for a gas turbine engine, comprising:
a turbine blade extending radially outwardly to a radially outer tip and for rotation about an axis of rotation; and
a component having a first side and a second side, wherein the first side has a cavity layer having a plurality of cavities on a portion of the first side, the plurality of cavities having a first group of cavities with a first cross-section and a second group of cavities with a second cross-section different from the first cross-section and a thermal barrier coating over the cavity layer, wherein a center of each cavity in the first group is arranged at a corner of a square and wherein the first cross-section is a circle and the second cross section is a slot shape, and each cavity in the second group is arranged along an edge of the square.

14. The turbine section of claim 13, wherein a ratio of an area of the plurality of cavities in the square to an area of the square is greater than about 0.56.

15. The turbine section of claim 13, wherein the thermal barrier coating is an abradable coating.

16. The turbine section of claim 13, wherein the component is one of a ceramic and a metallic material.

* * * * *